US00RE37218E

(19) United States
(12) Reissued Patent
Densmore et al.

(10) Patent Number: US RE37,218 E
(45) Date of Reissued Patent: Jun. 12, 2001

(54) SATELLITE-TRACKING MILLIMETER-WAVE REFLECTOR ANTENNA SYSTEM FOR MOBILE SATELLITE-TRACKING

(75) Inventors: Arthur C. Densmore, Chino Hills; Vahraz Jamnejad, Pasadena; Kenneth E. Woo, San Marino, all of CA (US)

(73) Assignee: The United States of America as represented by the Administrator of the National Aeronautics and Space Administration, Washington, DC (US)

(21) Appl. No.: 08/613,739

(22) Filed: Feb. 15, 1996

Related U.S. Patent Documents

Reissue of:
(64) Patent No.: 5,398,035
Issued: Mar. 14, 1995
Appl. No.: 07/999,794
Filed: Nov. 30, 1992

(51) Int. Cl.[7] ..... H01Q 19/12
(52) U.S. Cl. ..... 343/713; 343/786; 343/840
(58) Field of Search ..... 343/711, 713, 343/781 R, 765, 766, 786, 840, 882; 342/357, 359

(56) References Cited

U.S. PATENT DOCUMENTS

| | | | |
|---|---|---|---|
| 2,534,271 | 12/1950 | Kienow | 250/33.65 |
| 2,858,535 | 10/1958 | Crandell et al. | 343/756 |
| 3,790,941 | 2/1974 | Chivers et al. | 343/786 |
| 3,921,177 | 11/1975 | Munson | 343/769 |
| 4,543,579 | 9/1985 | Teshirogi | 343/365 |
| 4,630,056 | 12/1986 | Noguchi et al. | 342/357 |
| 4,654,622 | 3/1987 | Foss et al. | 338/14 |
| 4,689,631 | 8/1987 | Gans et al. | 343/781 R |
| 4,725,843 | 2/1988 | Suzuki et al. | 342/359 |
| 4,730,193 | 3/1988 | Schwartz et al. | 343/700 |
| 4,766,444 | 8/1988 | Conroy et al. | 343/844 |
| 4,801,943 | 1/1989 | Yabu et al. | 343/700 |
| 4,803,490 | 2/1989 | Kruger | 342/158 |

(List continued on next page.)

*Primary Examiner*—Tan Ho
(74) *Attorney, Agent, or Firm*—John H. Kusmiss

(57) ABSTRACT

A miniature dual-band two-way mobile satellite-tracking antenna system mounted on a movable vehicle includes a miniature parabolic reflector dish having an elliptical aperture with major and minor elliptical axes aligned horizontally and vertically, respectively, to maximize azimuthal directionality and minimize elevational directionality to an extent corresponding to expected pitch excursions of the movable ground vehicle. A feed-horn has a back end and an open front end facing the reflector dish and has vertical side walls opening out from the back end to the front end at a lesser horn angle and horizontal top and bottom walls opening out from the back end to the front end at a greater horn angle. An RF circuit couples two different signal bands between the feed-horn and the user. An antenna attitude controller maintains an antenna azimuth direction relative to the satellite by rotating it in azimuth in response to sensed yaw motions of the movable ground vehicle so as to compensate for the yaw motions to within a pointing error angle. The controller sinusoidally dithers the antenna through a small azimuth dither angle greater than the pointing error angle while sensing a signal from the satellite received at the reflector dish, and deduces the pointing angle error from dither-induced fluctuations in the received signal.

39 Claims, 13 Drawing Sheets

U.S. PATENT DOCUMENTS

| | | | |
|---|---|---|---|
| 4,823,134 | 4/1989 | James et al. | 342/359 |
| 4,833,484 | 5/1989 | Garrood et al. | 343/713 |
| 4,839,659 | 6/1989 | Stern et al. | 343/700 |
| 4,841,303 | 6/1989 | Anderson | 342/359 |
| 4,873,526 | 10/1989 | Katsuo | 342/359 |
| 4,876,554 | 10/1989 | Tubbs | 343/780 |
| 4,914,443 | 4/1990 | Gans et al. | 343/786 |
| 4,918,749 | 4/1990 | Entschladen et al. | 455/327 |
| 4,933,680 | 6/1990 | Shapiro et al. | 343/700 |
| 4,965,869 | 10/1990 | Fortney | 343/781 R |
| 5,019,829 | 5/1991 | Heckman et al. | 343/700 |
| 5,045,862 | 9/1991 | Alden et al. | 343/700 |
| 5,061,936 | 10/1991 | Suzuki | 342/359 |
| 5,087,920 | 2/1992 | Tsurumaru et al. | 343/700 |
| 5,105,200 | 4/1992 | Koepf | 343/700 |
| 5,162,808 | 11/1992 | Kim | 343/786 |
| 5,227,806 * | 7/1993 | Eguchi | 343/765 |
| 5,528,250 * | 6/1996 | Sherwood et al. | 343/765 |

* cited by examiner

SATELLITE-TRACKING MILLIMETER-WAVE REFLECTOR ANTENNA SYSTEM FOR MOBILE SATELLITE-TRACKING

Matter enclosed in heavy brackets [ ] appears in the original patent but forms no part of this reissue specification; matter printed in italics indicates the additions made by reissue.

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Technical Field

This invention is related to compact micro-wave satellite antennas and automatic antenna positioning systems for tracking a satellite from a moving vehicle.

2. Background Art

Attitude control systems for mobile antennas in satellite communication systems are disclosed in U.S. Pat. Nos. 5,061,963, 4,873,526 and 4,725,843. In these devices, the antenna includes a feed horn facing a conical reflector dish. In order for the reflector dish to capture an adequate signal from the satellite, it must be rather large, typically on the order of a few hundred wave lengths across, resulting in the ungainly and large mobile antenna systems illustrated in the above-referenced patents. The relatively large reflector size provides an adequate antenna gain, arising from the directionality of the antenna gain pattern. The antenna must be pointed directly at the satellite in order to receive an adequate signal therefrom. Thus, such mobile antenna systems must have an attitude control system which insures that the antenna points directly at the satellite to within only a few degrees error in azimuth and elevation. For a geostationary satellite, one might assume that there would be no change in the elevational angle to which the antenna may be aligned. However, since a moving vehicle may pitch significantly, the attitude control system of the antenna must include not only azimuth angle control but also elevation angle control. Alternatively, if the motion of the vehicle can be restricted to avoid any significant pitching, the elevational angle control may be dispensed with. However, it is not always practical to restrict the vehicle motion. Three-dimensional antenna direction control using complex antenna control systems is disclosed in U.S. Pat. Nos. 4,823,134 and 4,630,056. Such antenna control systems suffer from the disadvantage of being very complex and therefore unwieldy.

The mobile antennas of the type illustrated in the above-referenced patents typically are tuned to have a peak gain at a specific frequency. The design of such antennas and their response becomes very critical at extremely high frequencies such as K-band and Ka-band frequencies (on the order of 20 and 30 GHz, respectively). A severe problem is encountered when it is desired to transmit signals to the satellite at one frequency (for example at Ka-band frequency) and to receive signals from the satellite at another frequency (for example at K-band frequency). The microwave components of the antenna, particularly the feed-horn assembly facing the reflector dish, are typically tuned to a specific transmitting or receiving frequency, and are not suitable for handling two extremely different frequencies (such as frequencies lying in two different bands).

Thus, it has seemed that a mobile satellite-tracking antenna requires a relatively large antenna size (including a reflector dish on the order of a few hundred wavelengths across) and a complex antenna attitude control system to maintain antenna alignment with the satellite in two dimensions, while permitting the ground vehicle on which the antenna is mounted to move through significant pitch and yaw angles. Moreover, it does not seem practical to accommodate two different frequency channels lying in different bands (such as K-band and Ka-band signals) using the same antenna.

Accordingly, one object of the invention is to provide a mobile satellite-tracking antenna system in which the antenna size is greatly reduced from that of the present state of the art with an optimum antenna gain or antenna performance.

It is another object of the invention to provide a mobile satellite-tracking antenna capable of transmitting or receiving signals with respect to an orbiting satellite in two different channels or different communication bands such as the K-band and the Ka-band using the same feed-horn assembly and the same reflector dish and attain similar RF performance for both bands.

It is a further object of the invention to provide a mobile satellite-tracking antenna having a very simple low bandwidth control system for maintaining antenna orientation with respect to an orbiting satellite, particularly a geostationary satellite.

It is a related object of the invention to provide a high performance dual-band mobile satellite-tracking antenna which requires antenna attitude control in azimuth only.

It is a yet further object of the invention to provide a mobile satellite-tracking antenna having less elevational directionality to provide low-loss performance over large pitch angles of the ground vehicle on which the antenna is mounted.

It is a still further object of the invention to provide a mobile satellite-tracking antenna having an antenna attitude control system for maintaining antenna orientation with respect to a geostationary satellite, requiring only a ground vehicle yaw angle sensor and an antenna azimuth angle sensor.

It is a still further object of the invention to provide a satellite-tracking antenna having a feed-horn assembly capable of simultaneously feeding signals in K-band and the Ka-band frequency ranges to a reflecting dish on the order of only several to ten wavelengths in extent while requiring attitude control in azimuth only and requiring only an inertial vehicle yaw angle sensor and antenna azimuth angle sensor while maintaining fine azimuth direction control.

The forgoing objects would fulfil the goal of an extremely light-weight compact mobile antenna system mountable on the roof of a small vehicle for tracking the Advanced Communication Technology Satellite (ACTS) which transmits Ka-band signals to the mobile antenna and receives K-band signals from the mobile antenna.

STATEMENT OF THE INVENTION

The foregoing objects are realized in the invention in which the reflector dish is an elliptical section of a paraboloid surface and is offset with respect to a feed-horn capable of feeding Ka-band and K-band signals. The ellipse defining the section of the paraboloid surface of the reflector dish is sufficiently eccentric so that the antenna assembly exhibits very low losses over small elevational excursions on the order of 12 degrees. For this purpose, the reflector dish minor elliptical axis is oriented in the vertical or elevational direction. This accommodates ground vehicle pitch excursions for typical road conditions, thus eliminating the need for any elevational attitude control of the antenna. The reflector dish is only about four wavelengths in extent along its minor axis and about ten wavelengths in extent along its major axis at K-band frequencies. This greatly reduces the size the antenna system relatively to the current state of the art.

The feed-horn opens out toward the center of the reflector dish in a truncated pyramidal shape. Specifically, in the elevational direction the top and bottom walls of the feed-horn open out at opposing 13 degree angles, while the side walls of the feed-horn open out at only 2-degree angles with respect to the center line of the feed-horn, in one embodiment. Thus, both the feed-horn and the reflector dish are non-isotropic configurations which provide a high degree of directional selectivity in the azimuth direction and a lesser degree of directional selectivity in the elevational direction in the antenna pattern. The lesser selectivity in the elevational direction of the antenna pattern eliminates the need for elevational antenna attitude control, as mentioned previously. The greater directional selectivity of the antenna pattern in the azimuthal direction enhances the antenna gain and performance. The foregoing nonisotropic shapes of the feed-horn and the reflector dish provide similar antenna performance in both the K-band and the Ka-band frequency ranges, a significant advantage.

Very fine antenna attitude control in the azimuthal direction is provided using only a relatively gross vehicle yaw angle sensor and an antenna azimuthal direction sensor (such as optical encoders). The sensors themselves provide no fine control of the antenna azimuth direction. The fine control is provided (without the addition of any other sensors) by a dithering algorithm in which the antenna is sinusoidally dithered about its selected azimuthal angle and the resulting signal fluctuations are processed to deduce fine azimuthal angle errors with respect to the satellite location.

The control loop of the antenna subtracts the sensed vehicle yaw angle from the current antenna azimuth angle, the difference providing a gross antenna azimuth position to within a pointing angle error. An error term corresponding to the pointing angle error is then determined using the dithering algorithm for control feedback to the antenna azimuth drive motors. This error term is first filtered in a low-pass filter to remove dithering noise. It is then used as rate feed-back and also as acceleration feed-back superimposed on the sensed vehicle yaw rate to provide a fine adjustment command to the antenna azimuth drive motor. The dithering algorithm computes the pointing angle error from asymmetries in the dither-induced signal fluctuations in the signal (such as a pilot signal) received from the satellite. In one embodiment of the invention, the vehicle yaw sensor is an inertial sensor such as an inertial measurement unit.

The antenna system of the invention operates in the K and Ka-bands using conventional components, including a traveling wave tube for generating the Ka-band signal for transmission to the satellite and a low noise amplifier for sensing the received K-band signal from the satellite. The traveling wave tube and the low noise amplifier are both connected to a conventional microwave diplexer which is connected through a rotary joint to an upper diplexer immediately beneath the antenna. The upper diplexer is of the conventional type having a Ka-band output (for carrying the signal from the traveling wave tube) and a K-band input (for carrying the signal destined for the low noise amplifier). The Ka-band output and the K-band input of the upper diplexer are both connected to two respective ports of an orthomode transducer of the type well-known in the art. The orthomode transducer is a conventional waveguide assembly which couples the Ka-band port of the diplexer to the longitudinal back end of the feed-horn and couples the K-band port of the upper diplexer to a side port of the feed-horn. The orthomode transducer is designed for horizontal polarization of the Ka-band signal and vertical polarization for the K-band signal.

Thus the invention provides a very small dual-band antenna which tracks the satellite using only a vehicle yaw rate sensor and an antenna azimuth position servo to achieve extremely fine azimuth control and not requiring antenna elevational control while achieving commensurate performance at both K-band and Ka-band frequency ranges. In the preferred embodiment described below, the antenna exhibits a gain of over 24 dB in the Ka-band and 21 dB in the K-band.

A unique advantage of the invention is that in addition to the foregoing, the antenna may be adjusted for mobile operations within any large latitude range by simply adjusting the stationary elevational orientation of the reflector dish. The elevational orientation of the reflector dish is fixed at a selected angle corresponding to the satellite elevation observed within a geographic area in which the mobile antenna is to be operated. For example, if the antenna is to communicate with the ACTS satellite during mobile operations in the southern California region, then the elevational orientation of the reflector dish is fixed at 46 degrees.

BRIEF DESCRIPTION OF THE DRAWINGS

FIGS. 5A through 5D illustrate the dual-band feed-horn of the antenna system of FIGS. 4A through 4C, of which FIGS. 5B, 5C and 5D are side, top and front views, respectively.

DETAILED DESCRIPTION OF THE INVENTION

Figure 1:
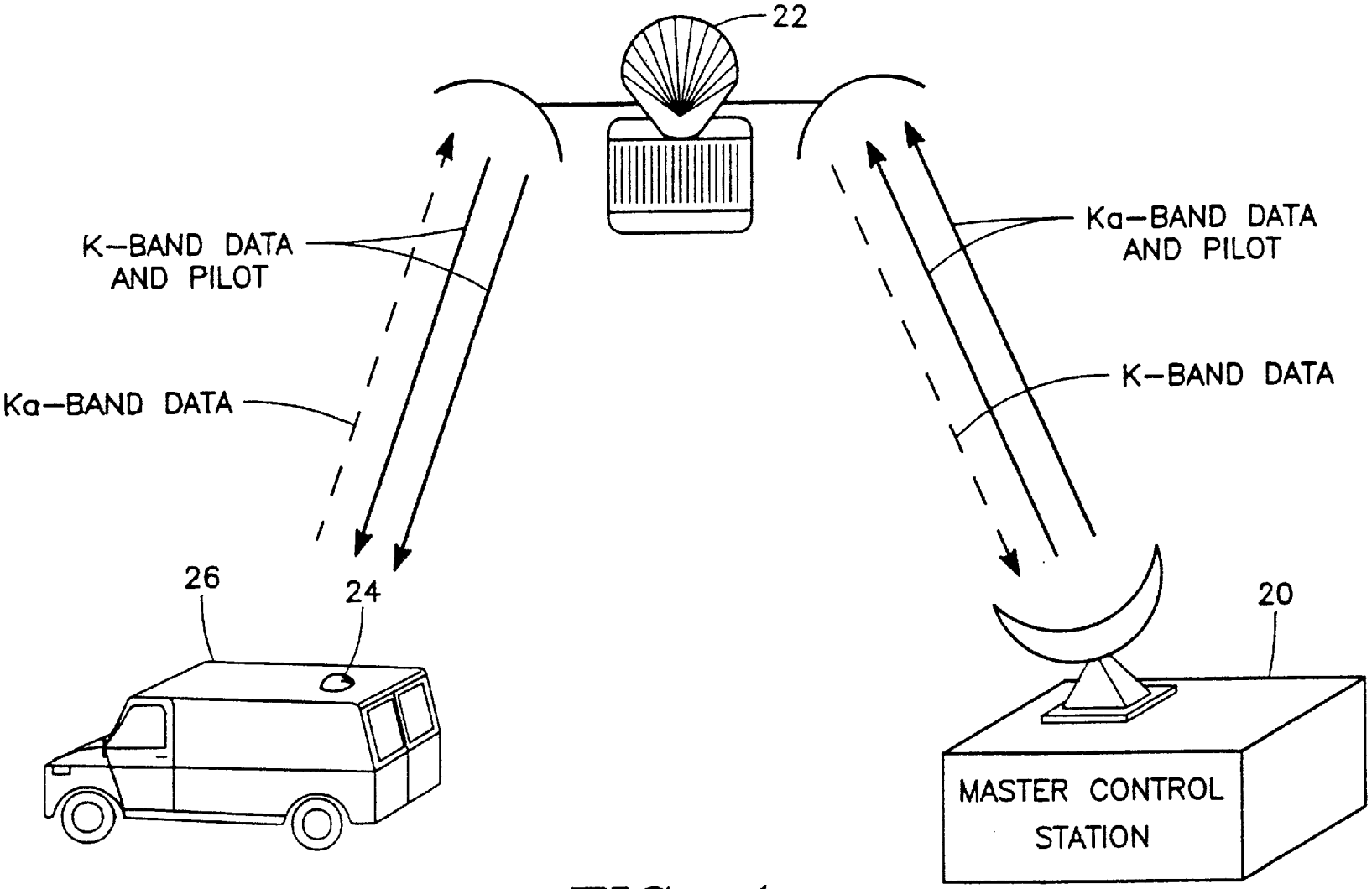
FIG. 1 is a diagram illustrating the use of the present invention as a mobile antenna communicating with a permanent ground station through a orbiting satellite.

Referring to FIG. 1, a ground master control station 20 transmits Ka-band data to a geostationary satellite 22 and receives K-band data from the satellite 22. The satellite 22 converts the Ka-band data received from the ground station 20 to K-band data and transmits it to a compact satellite-tracking mobile vehicle antenna 24 of the present invention mounted on a ground vehicle 26. The Ka-band data transmitted by the master ground station 20 includes a pilot signal, so that the converted K-band data transmitted by the satellite 22 also includes a corresponding pilot signal received by the satellite-tracking mobile vehicle antenna 24. Furthermore, the mobile vehicle antenna 24 transmits Ka-band data to the satellite 22 which is converted to K-band data by the satellite 22 and transmitted to the master ground control station 20.

Figure 2:
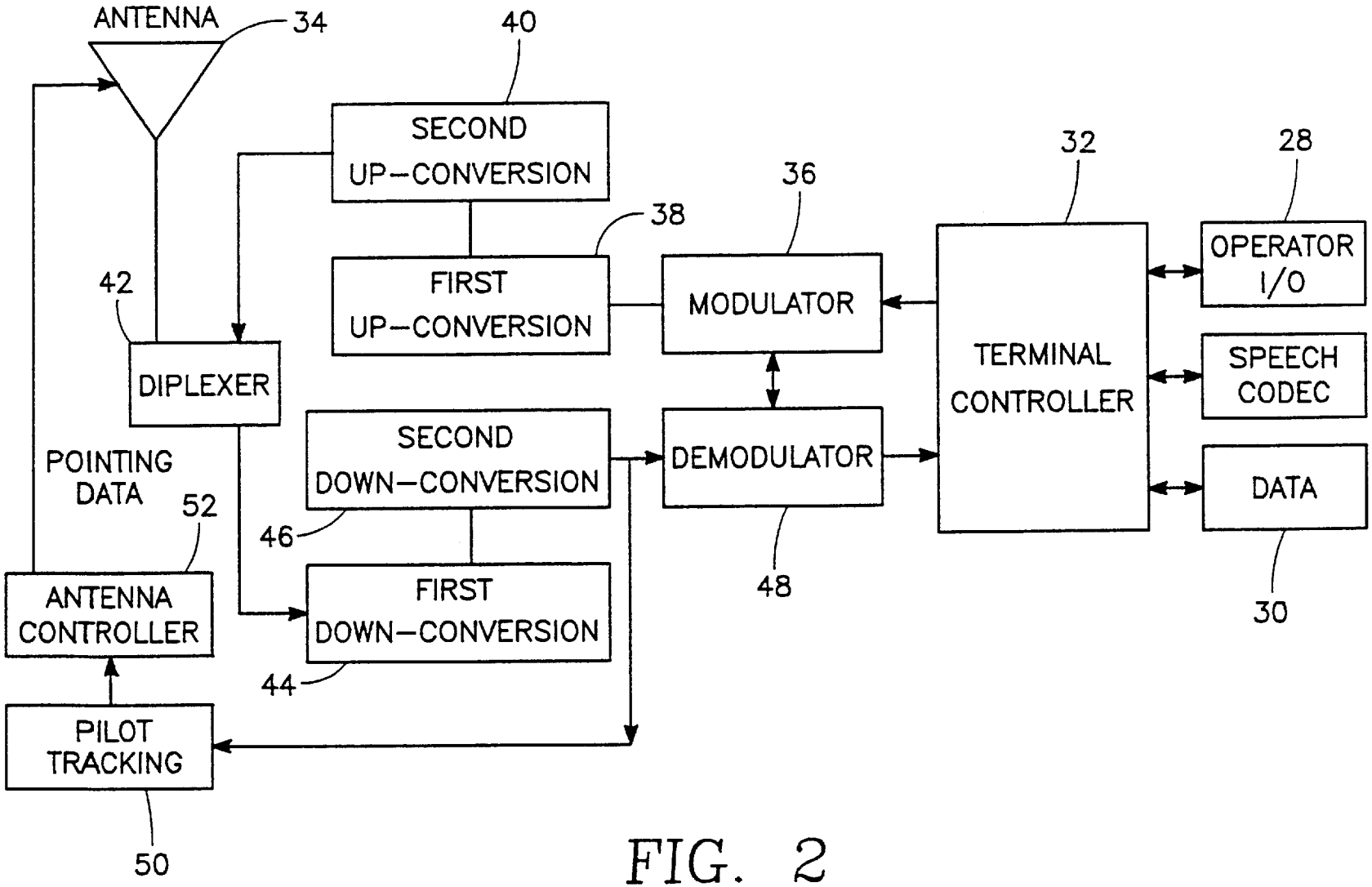
FIG. 2 is a block diagram of the mobile antenna system embodying the present invention.

Referring to FIG. 2, the satellite-tracking mobile vehicle antenna 24 comprises a system including an operator input/output terminal 28, a data port 30, a terminal controller 32 communicating to an antenna 34 through two channels. The first channel is a transmission channel including a modulator 36, a first up-conversion stage 38 and a second up-conversion stage 40. The modulator 36 modulates data from the terminal controller 32 onto an RF carrier which is then transformed to a Ka-band carrier in two stages, namely the first up-conversion stage 38 and the second up-conversion stage 40, using techniques well-known in the art. The second up-conversion stage 40 transmits the data on the Ka-band carrier to a diplexer assembly 42 which then applies it to the antenna 34 for transmission to the satellite. The second channel is a receive channel in which K-band signals received by the antenna 34 are routed by the diplexer 42 to a first down-conversion stage 44, a second down-conversion stage 46 and then to a demodulator 48 whose output is connected to the control terminal 32. The first and second down-conversion stages 44, 46 down-convert the carrier from the K-band frequency to an RF frequency in two stages using techniques well-known in the art. The demodulator 48 removes the RF carrier so that the data is applied to the terminal controller 32. The pilot signal carried by the K-band data transmitted by the satellite 22 is pulled out of the second down-conversion stage 46 by a pilot tracking stage 50 and is used by an antenna controller 52 to control the azimuthal orientation of the antenna 34.

Figure 3:
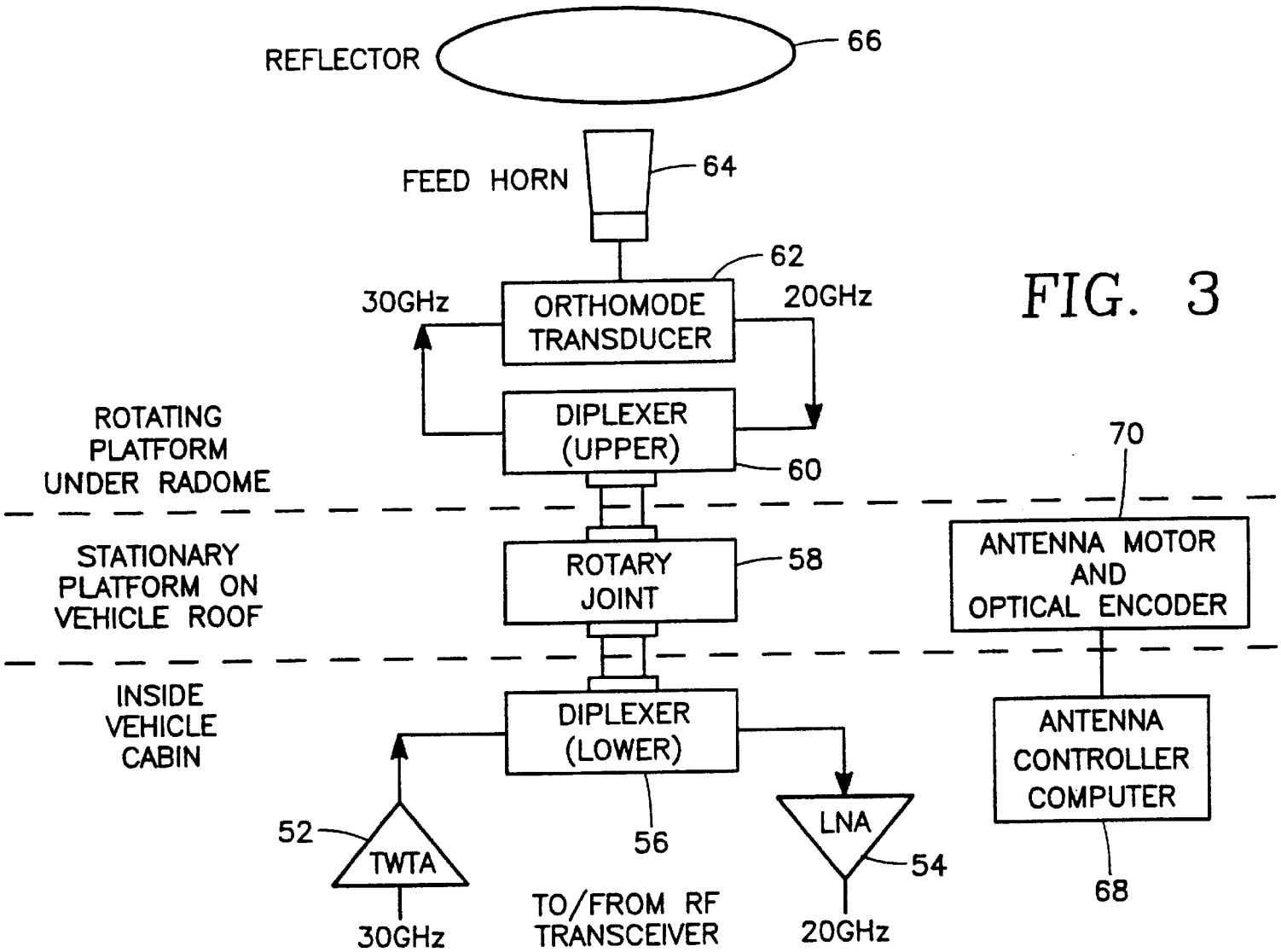
FIG. 3 is block diagram of the RF circuitry of the antenna system of FIG. 2.

Referring to FIG. 3, the antenna 34 is distributed between two sections, one located inside the cabin of the ground vehicle 26 and the other located above the roof of the vehicle 26. Inside the cabin of the vehicle 26, the antenna system includes a traveling wave tube assembly 52 which generates the Ka-band signal and a low noise amplifier 54 which senses the incoming K-band signal. The output of the traveling wave tube 52 is connected to one single-band port of a lower diplexer 56 of the type well-known in the art while another single-band port of the diplexer 56 is connected to the input of the low noise amplifier 54. A dual-band port of the diplexer 56 is connected through a conventional microwave rotary joint 58 to a dual-band port of an upper diplexer 60. The upper diplexer 60 has a Ka-band (30 GHz) port connected to a Ka-band port of a conventional orthomode transducer 62. A K-band (20 GHz) output port of the orthomode transducer 62 is connected to a K-band port of the upper diplexer 60, using techniques well-known in the art. A feed-horn port of the orthomode transducer is connected to the back end of the feed-horn 64 whose output end faces an offset reflector dish 66. Motion of the rotary joint 58 is controlled by an antenna controller computer 68 of the antenna controller 52 of FIG. 2 governing an antenna motor and optical encoder 70.

The RF circuit of FIG. 3 is but one example of a conventional RF circuit capable of connecting the traveling wave tube 52 and the low noise amplifier 54 to the antenna feed-horn 64. The present invention may be implemented with any suitable RF circuit in lieu of the RF circuit of FIG. 3 by the skilled worker. The implementation techniques of such RF circuits are known in the art and are beyond the scope of this specification.

Figure 4A:
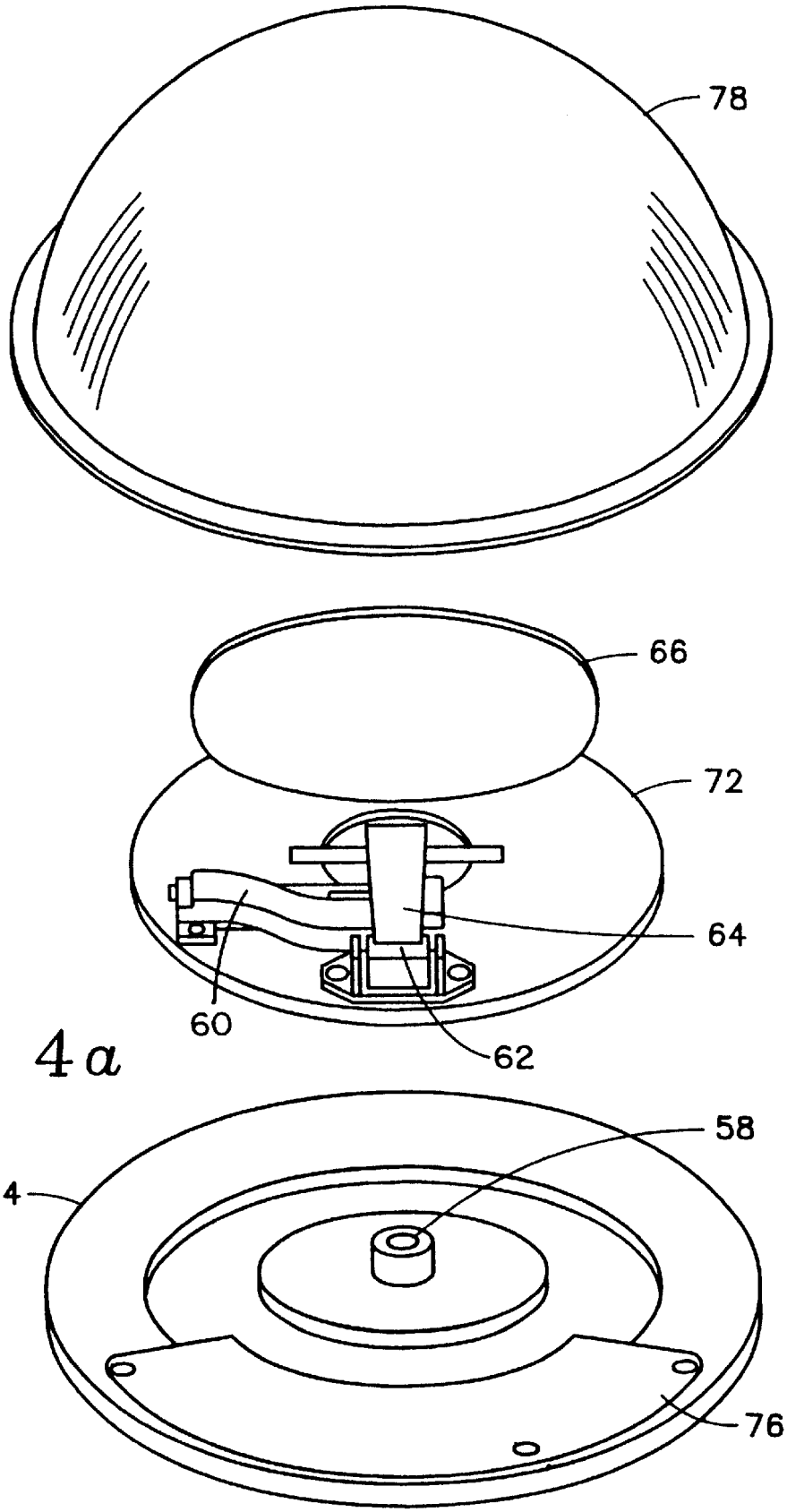
FIGS. 4A through 4C illustrate the physical configuration of the antenna system in a preferred embodiment of the present invention.
Figure 4B:
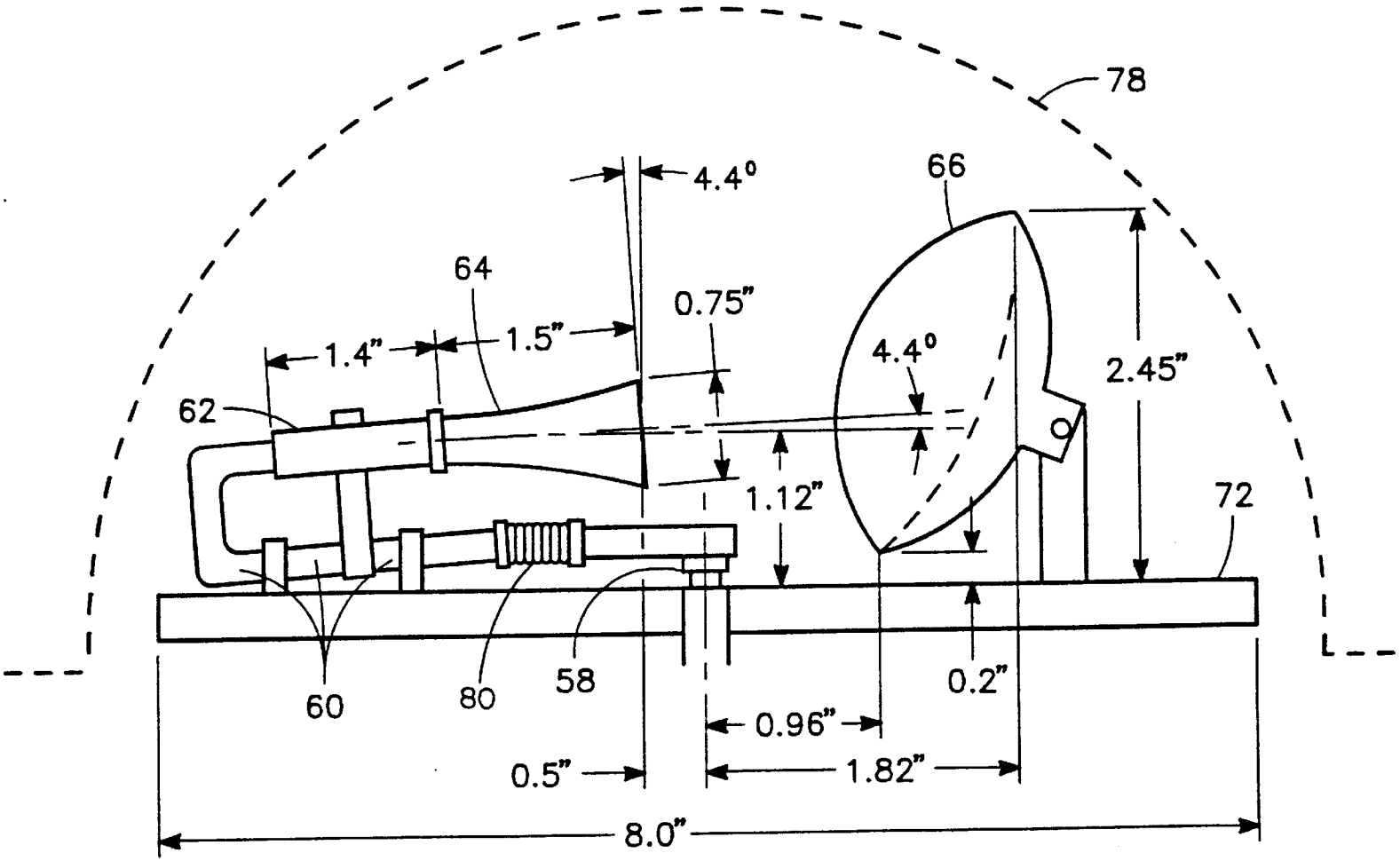
Figure 4C:
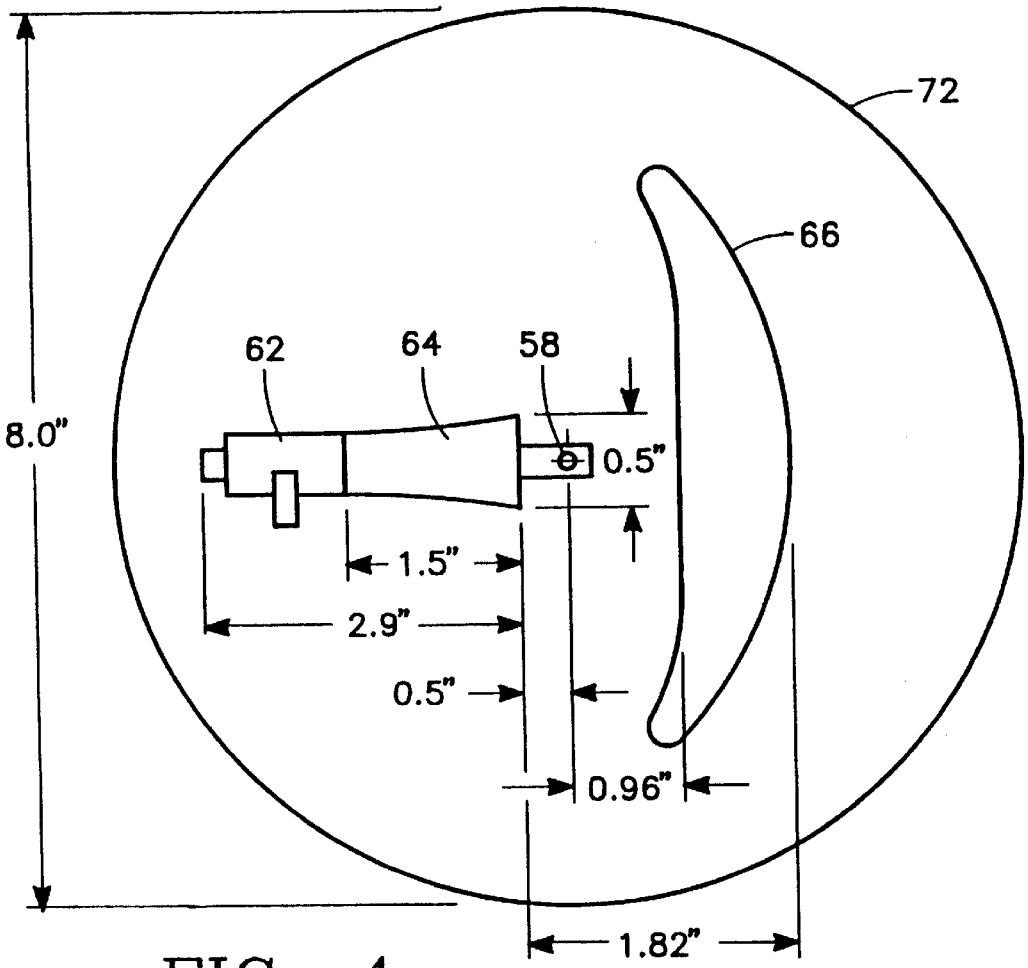

Referring to FIGS. 4A through 4C, the antenna assembly 34 includes the parabolic reflector dish 66 and the truncated pyramidal feed-horn 64. The orthomode transducer 62, upper diplexer 60, feed-horn 64 and parabolic reflector dish 66 rest on a rotating platform 72 coupled to a pancake stepper motor platform 74 whose relative motion is detected by optical encoders 76 of the antenna motor and optical encoder 70. A plastic hemiellipsoidal radome 78 covers the entire assembly and is preferably coated with a hydrophobic coating of the type well-known of the art. The dual-band port of the diplexer 60 is connected to the rotary joint 58 as shown in FIGS. 4A through 4C. The microwave waveguide assembly including the upper diplexer 60 and the orthomode transducer 62 were obtained from the Gamma-F Corporation of Torrance, Calif.

The upper diplexer 60 is connected to the rotary joint 58 via a conventional flex waveguide 80 as shown in FIGS. 4A through 4C. The assembly including the diplexer 60, the orthomode transducer 62 and the flex waveguide 80 as well as the connection of the rotary joint 58 preferably have the dimensions indicated in FIGS. 4A–4C and obey the specifications set forth in Table I.

TABLE I

| FEED ASSEMBLY REQUIREMENTS AND SPECIFICATIONS | |
|---|---|
| DIFLEXER: | |
| Frequencies: | |
| Channel 1 (Transmit): | 22.63 ± 0.14 GHz |
| Channel 2 (Receive): | 17.71 ± 0.14 GHz |
| Isolation: | >30 dM (in either |
| Insertion Loss: | <0.5 dM (in both channels) |
| VSWR: | <1.5:1 (at all ports) |
| ORTHONODE TRANSDUCER | |
| Frequencies: | |
| Channel 1 (Transmit): | 29.63 ± 0.16 GHz |
| Channel 2 (Receive): | 19.91 ± 0.16 GHz |
| Polarization: | |
| Channel 1 (Transmit): | Horizontal |
| Channel 2 (Receive): | Vertical |
| Isolation: | >10 dM (in either direction) |
| Insertion Loss: | <0.1 dM (for both frequencies) |
| VSWR: | <1.5:1 (at all ports) |
| FLEX WAVEGUIDE | |
| Insertion Loss: | <0.1 dM |
| CONNECTION TO THE ROTARY JOINT: | |
| Connector: | Male K connector |
| Loss: | <0.1 dM |

Figure 5A:
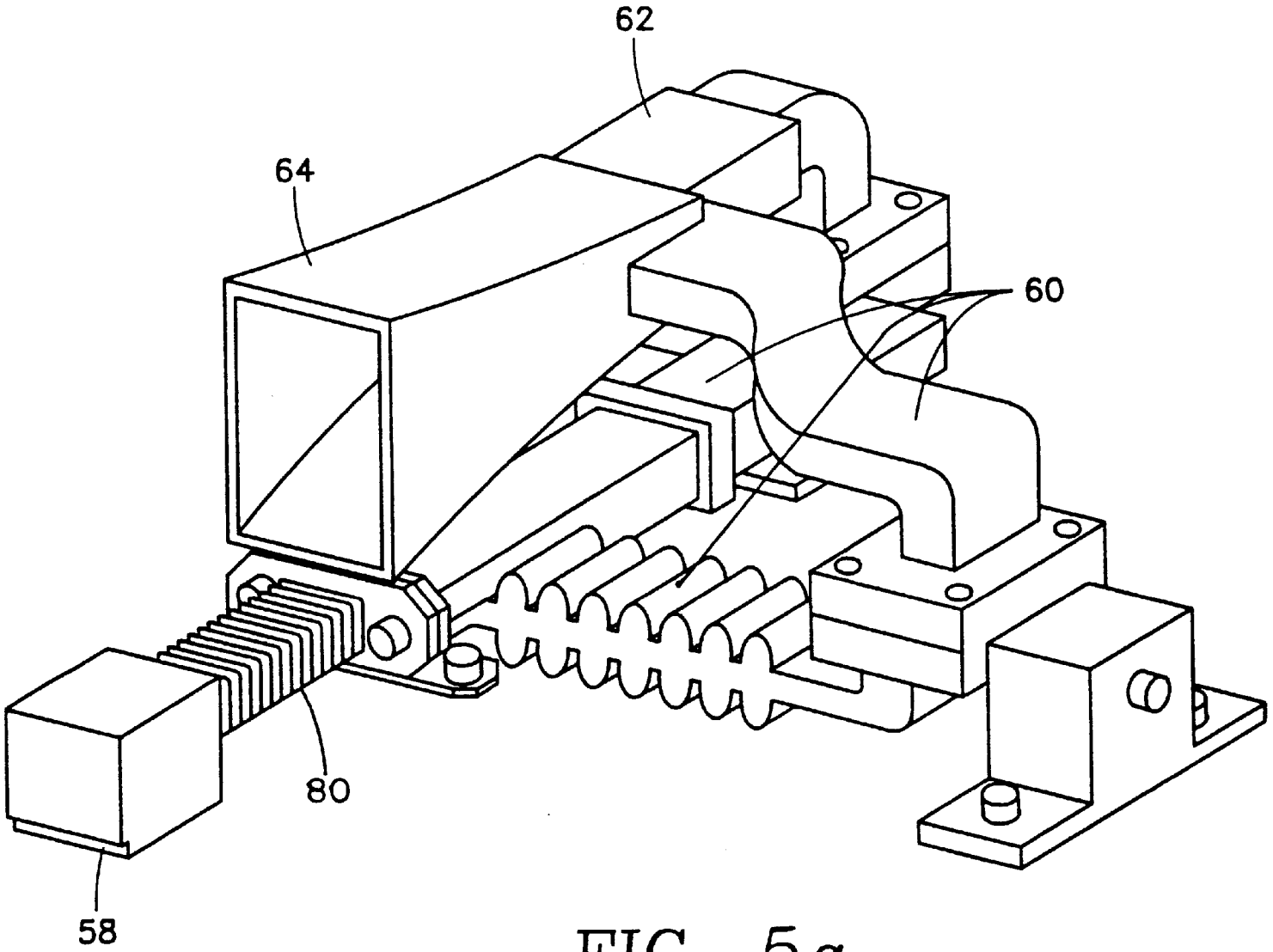
Figure 5B:
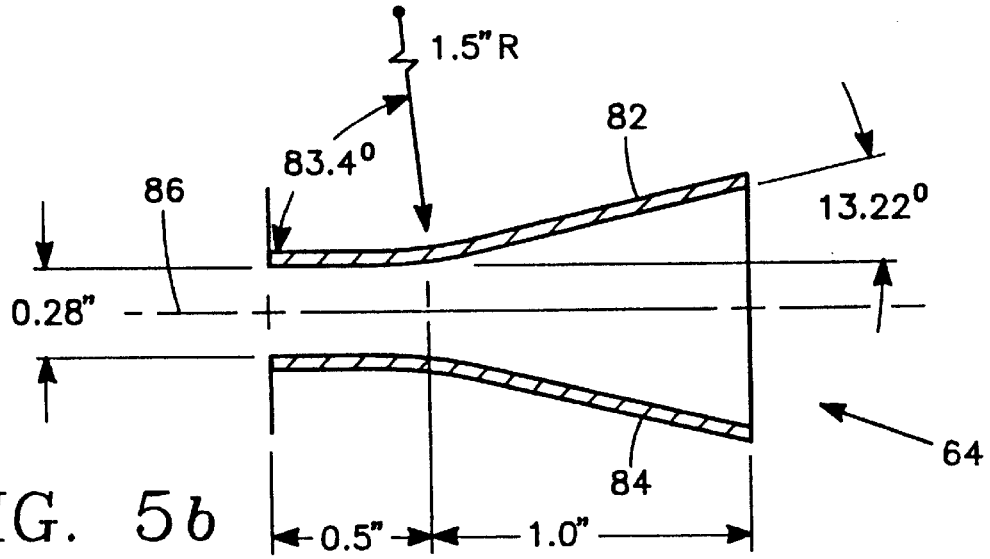
Figure 5C:
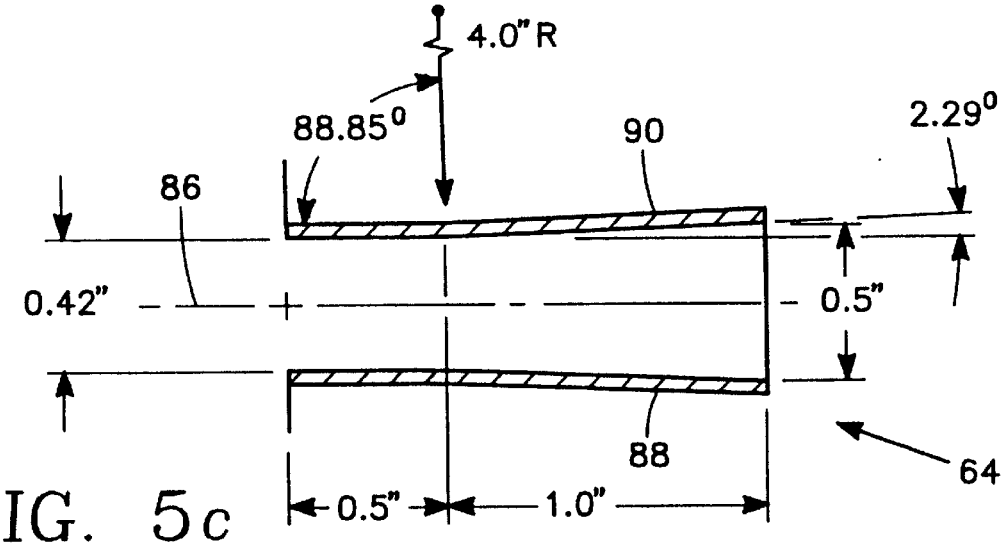
Figure 5D:
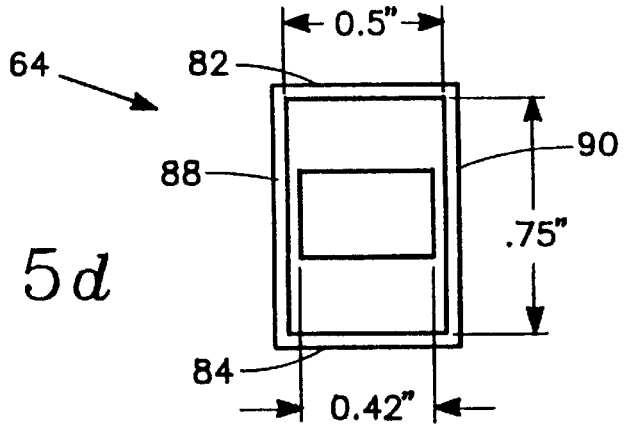

Referring to FIGS. 5A through 5D, the feed-horn 64 includes top and bottom walls 82, 84 extending symmetrically with respect to a center line 86 at opposing angles of 13.22 degrees. The feed-horn 64 further includes right and left side walls 88, 90 extending from the center line 86 at opposing 2.29 degree angles, the broad end of the feed-horn 64 facing the parabolic reflector dish 66. The wall thicknesses are 0.04 in. throughout. The remaining dimensions are as shown in FIGS. 5A through 5C.

Figure 6B:
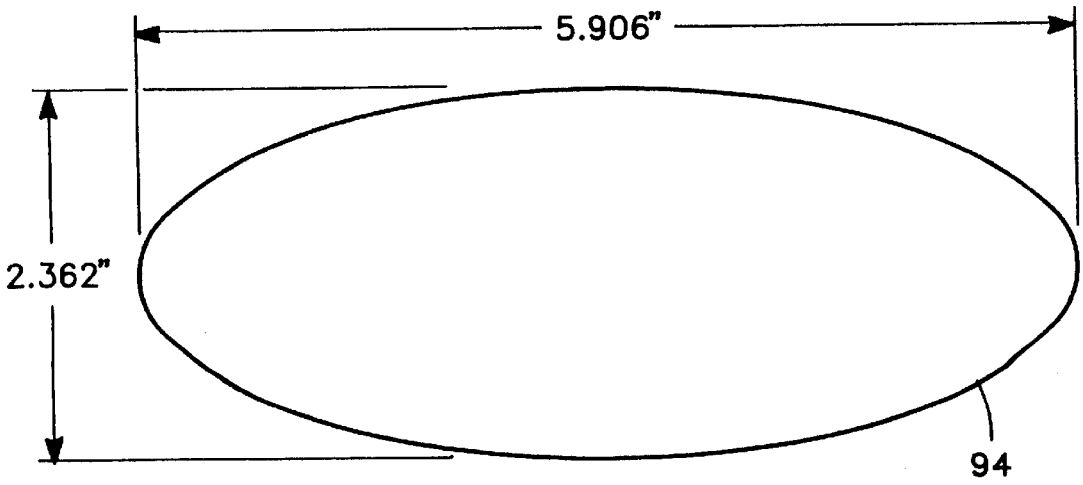
FIGS. 6A through 6B illustrate the physical configuration of the reflector dish of the antenna system of FIGS. 4A through 4C.
Figure 6A:
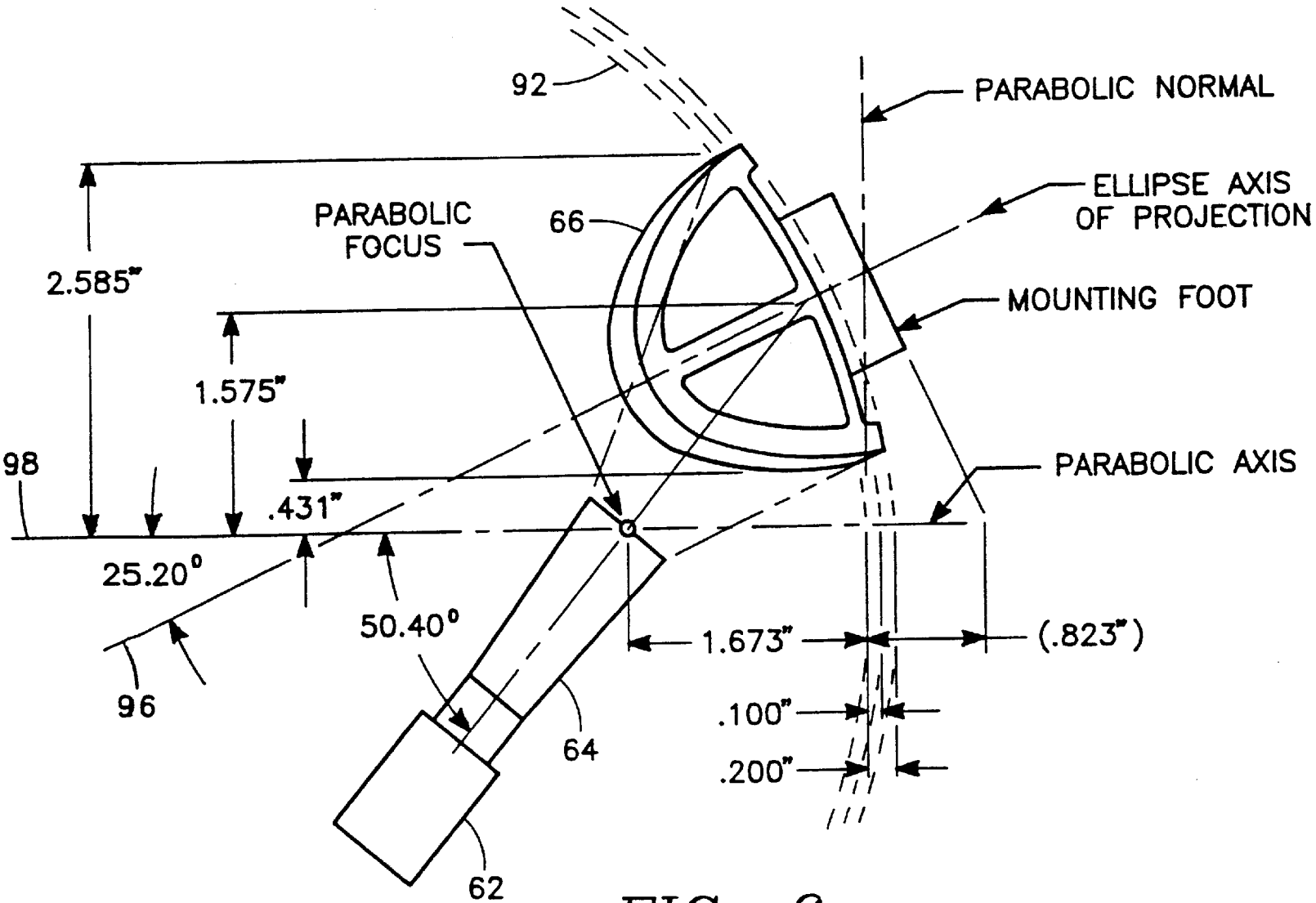

FIG. 6A illustrates how the feed-horn 64 is aligned with respect to the parabolic reflector dish 66 and further shows how the shape of the parabolic reflector dish 66 is defined with respect to the surface of a paraboloid 92. An ellipse 94 (illustrated in FIG. 6B) whose major axis is 5.906/2 in. and whose minor axis is 2,362/2 in. is projected along the projection line 96 of FIG. 6A at 25.2 degrees with respect to the parabolic axis 98 of the paraboloid 92. The center of the output face of the feed-horn 64 coincides with the parabolic focus of the paraboloid 92. The paraboloid 92 is generated by rotating a two-dimensional parabola corresponding to the paraboloid 92 about the parabolic axis 98. The minor axis of the ellipse 94 lies in the plane containing the ellipse axis of projection 96 and the parabolic axis 98.

The resulting non-symmetrical (i.e. non-circular) shape of the reflector dish 66 provides pronounced directionality in the azimuthal direction (i.e., in the direction of rotation in the plane of the circular base 72) and less directionality in the elevational direction. Indeed, for 12 degree excursions in elevation, the antenna gain suffers not more than a 3 dB reduction. As mentioned previously herein, the 12 degree allowance in elevation orientation is the expected pitch excursion of the roving ground vehicle 26 on standard roadways. This feature therefore eliminates the need for an elevational antenna attitude control system. For this purpose, the feed-horn 64 opens out more widely in the elevational direction than it does in the azimuthal direction (13.22 degrees along each side in the elevational direction in contrast with only 2.29 degrees along either side in the azimuthal direction).

Figure 7A:
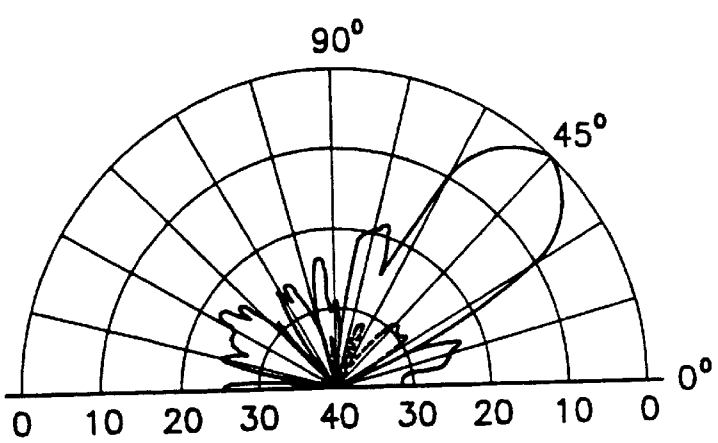
FIGS. 7A and 7B illustrate the elevation patterns of the antenna of the invention at K-band and Ka-band frequency ranges respectively.
Figure 7B:
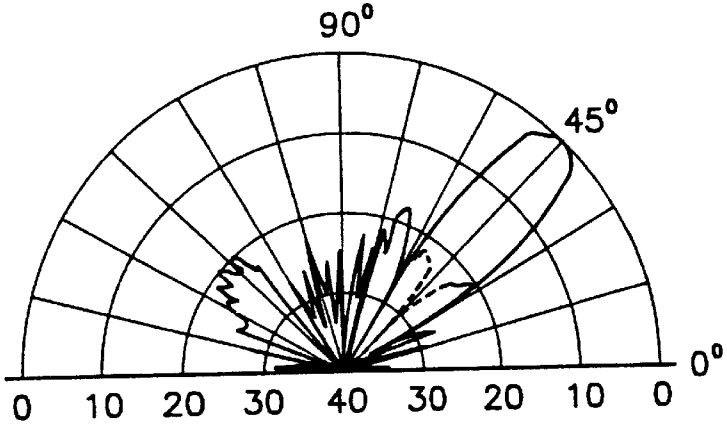

The results of the foregoing are illustrated in the diagrams of FIG. 7A through 7D which are graphs of the received signal intensity as a function of antenna orientation. The elevational orientation of the reflector dish 64 is set to the desired angle depending upon the location of the satellite of interest and the geographic region in which the mobile antenna system is to operate. Resulting elevational patterns are shown in FIG. 7A and FIG. 7B for K-band and Ka-band signals respectively. An additional feature is that the elevation beam angle may be changed from a nominal value of 46 degrees (suitable for communicating with the ACTS satellite from the southern California region) to anywhere between 30 and 60 degrees with a loss of no more than 1 dB, depending upon what general region the mobile antenna system is to travel in. This is accomplished by tilting the reflector dish 66 correspondingly. For this purpose, an adjustable mechanical fastener (not shown) holds the reflector dish 66 at a selected elevational orientation.

Figure 7C:
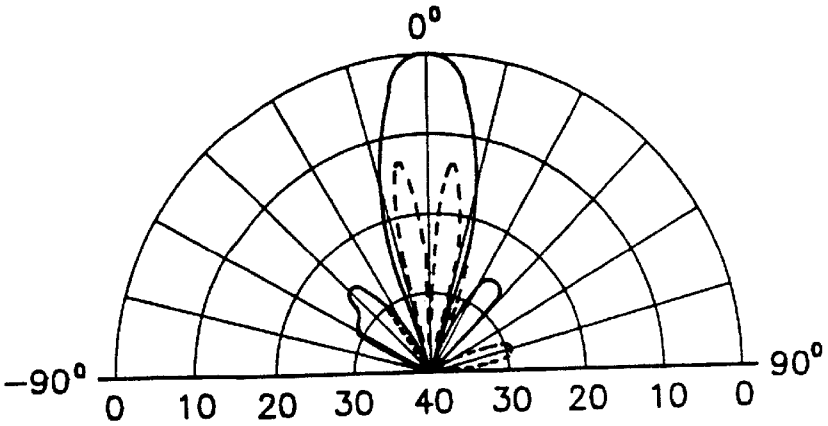
FIGS. 7C and 7D illustrate azimuth patterns of the antenna of the present invention at K-band and Ka-band frequency ranges respectively.
Figure 7D:
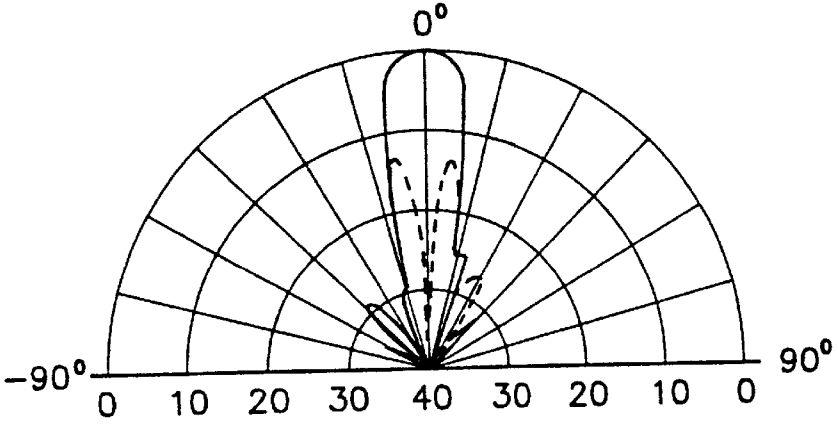

The azimuth patterns are shown in FIG. 7C and FIG. 7D for K-band and Ka-band signals respectively. These figures show that antenna performance is fairly consistent between both the K-band and Ka-band frequency ranges. This provides a significant advantage for the dual band communications system with which the antenna must interface. Note that the elevation patterns of FIG. 7A and FIG. 7B exhibit a wider and more broadly spaced peak than do the azimuth patterns of FIG. 7C and FIG. 7D, corresponding to the non-symmetrical antenna configuration discussed previously above. Thus, while the azimuth patterns quickly roll off as the angle error increases, the elevation patterns of FIG. 7A and FIG. 7B do not roll off so quickly, exhibiting only a 3 dB loss at an elevation angle of 12 degrees.

The axis of the feed-horn 64 makes an angle with respect to the access of symmetry of the reflector 66 so the feed-horn is offset with respect to the reflector 66.

The antenna controller 52 tracks the satellite as the mobile vehicle moves about. Tracking the satellite requires only azimuth steering (one-dimensional) since the antenna elevation coverage is wide enough to accommodate typical vehicle pitch and roll variations within any single geographical region of operation restricted to paved roads. The antenna controller steers the antenna azimuth angle in response to an inertial vehicle yaw-rate sensor and an estimate of the antenna pointing angle error is obtained by "mechanical dithering" of the antenna.

Almost all that is required of the pointing system is to compensate for vehicle turns (yaw). The antenna pointing error is defined as the difference between the antenna motor angle, with respect to the vehicle, and the inertial vehicle yaw angle. This represents the fact that, with a very distant and stationary source (a geostationary satellite), the direction to the source, as viewed from the vehicle, does not change significantly unless the vehicle turns. The inertial vehicle-yaw-rate sensor provides most of the information required to keep the antenna pointed at the satellite while the vehicle moves about. The yaw-rate sensor signal is integrated to yield an estimate of vehicle yaw angle, and the antenna is turned by this angle to counteract vehicle turns. Use of the full sensor bandwidth of about 300 Hz enables the antenna to respond quickly. There is no feedback in the yaw-rate sensor signal path. Any resulting pointing error is detected by the mechanical dithering process (feedback) and corrected by the tracking system. Drift of the sensor bias is the most significant source of pointing error, and the tracking system compensates for it. Since the sensor bias drifts very slowly, the resulting pointing error does not require fast correction and may be corrected very slowly. Only 0.1 Hz bandwidth of closed-loop feedback is sufficient to compensate for the inertial sensor bias drift. Minimizing the bandwidth of the closed-loop feedback is advantageous because of the accompanying flywheel effect and reduction in antenna jitter induced by noise in the pilot radio channel. The flywheel effect refers to the fact that the sluggish response of the low bandwidth feedback system tends to keep the antenna pointed at the satellite during short periods of signal outage, assuming proper yaw-rate sensor operation.

The tracking system relies heavily on the performance of the vehicle-yaw-rate sensor. (Compare the use of 300 Hz bandwidth from the yaw-rate sensor to the tracking system 0.1 Hz closed-loop feedback bandwidth.) The rate sensor must thereby be suitably accurate, and on the short-term provide all the information necessary to properly point the antenna. During short-term signal outages (less than 10 sec), when loss of the pilot signal disables the tracking feedback, the rate sensor is the sole source of antenna pointing information. The sensor bandwidth must be at least about 100 Hz, so the delay in reaction to a change in vehicle yaw does not cause significant pointing error (>0.5 deg). The yaw-rate sensor must also have good linearity, minimum scale-factor error, minimum noise and minimum short-term bias drift. Long-term (slow) yaw-rate sensor bias drift—such as that imposed by temperature variations—is compensated by the antenna tracking system feedback and is thereby of little concern in the selection of a particular sensor.

The dithering algorithm referred to above involves rocking the antenna sinusoidally in azimuth angle 1 deg in each direction at a 2 Hz rate. The satellite sends a special pilot signal for antenna tracking. By correlating the received pilot signal level sensed by the receiver with the commanded dithering of the antenna angle, the antenna controller computer determines the sign and magnitude of any pointing error.

To estimate pointing error using the mechanical dithering technique, the antenna controller makes the following computations while dithering the antenna: With the 2 Hz dither rate two estimates of pointing error are generated each second. Two values are accumulated during the dither cycle, and when each cycle is complete the ratio of the two values yields an estimate of the current antenna pointing error. The denominator is simply the average pilot signal level received through the antenna during the dither cycle. The numerator is the difference between 1) a weighted average of the pilot signal level received while the antenna is dithered to one side, and 2) a weighted average of the signal level while the antenna is dithered to the other side. Proper choice of the weighting function reduces the relative variance of the pointing error estimate. In this application the optimum weighting (or windowing) function is a sinusoidal window which matches the dithering function; its use reduces the variance by about 1 dB compared to a rectangular window.

Figure 8:
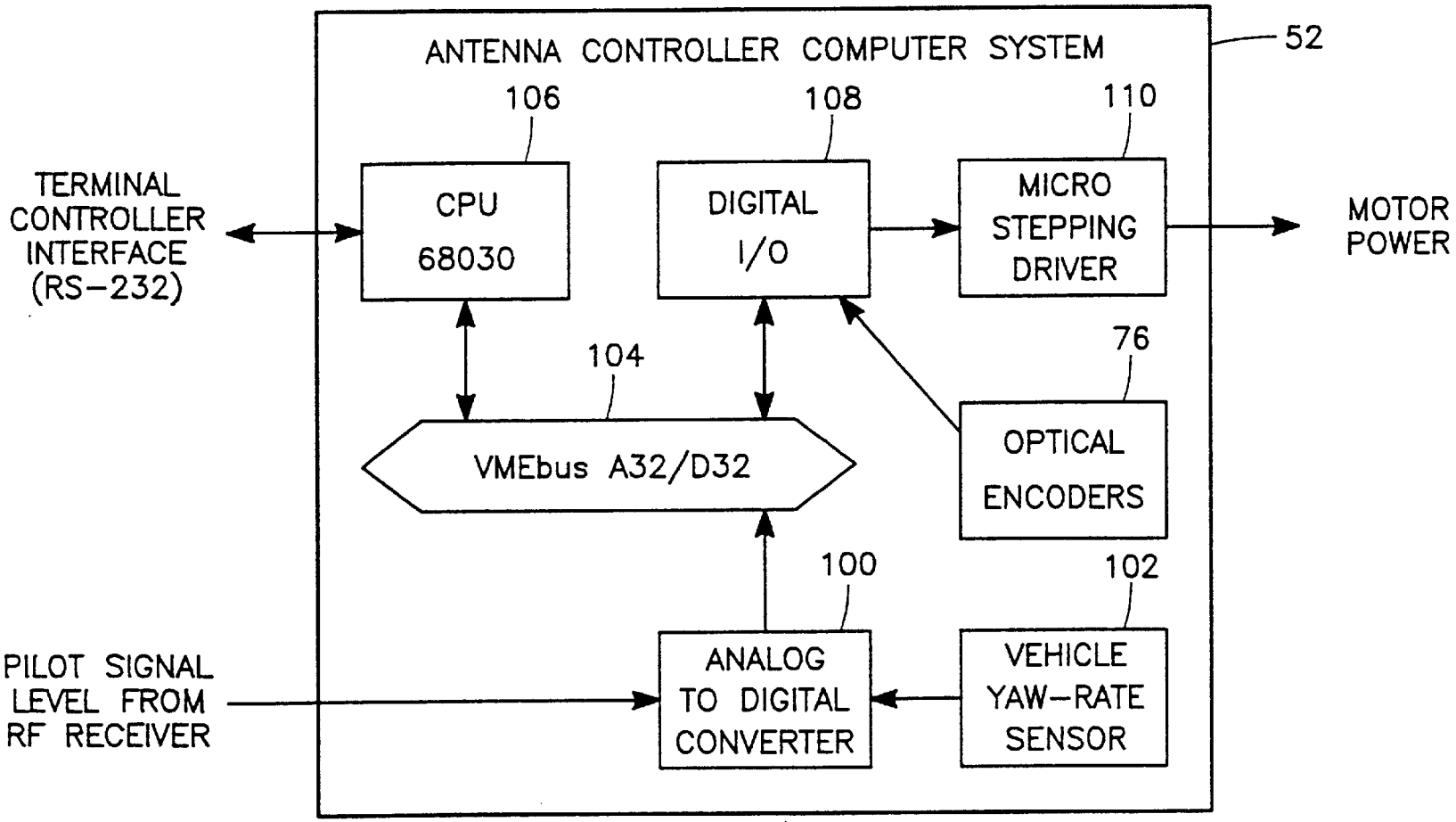
FIG. 8 is a block diagram of the antenna attitude controller of the invention.

The antenna controller 52 FIG. 2 is illustrated in the block diagram of FIG. 8. The pilot signal is received from the pilot tracking stage 50 of FIG. 2 and converted to a digital signal by an analog-to-digital converter 100. A vehicle yaw rate sensor 102 is an inertial measurement unit mounted on the vehicle 26 of FIG. 1 and its output is converted to another digital signal by the analog-to-digital converter 100. The output of the analog-to-digital converter 100 is carried by a bus 104 (such as a VME bus with 32 address bits and 32 data bits) to a central processing unit (CPU) 106 and to a digital input/output (I/O) port 108. The optical encoders 76 are also connected to the digital input output port 108.

The CPU 106 is programmed to access the digital data representing the pilot signal as well as the data representing the output of the vehicle yaw rate sensor 102 on the bus 104 and also to access the output of the optical encoders 76 via the digital I/O port 108 and the bus 104. The CPU 106 is further programmed to use that data to compute a digital command to correct the stepping motor position. It outputs this command on the bus 104 through the digital I/O port 108 to the micro stepping driver 110 of the pancake stepper motors in the pancake stepper motor base 74. In computing this command, the CPU 106 implements the control loop illustrated in the block diagram of FIG. 9.

Figure 9:
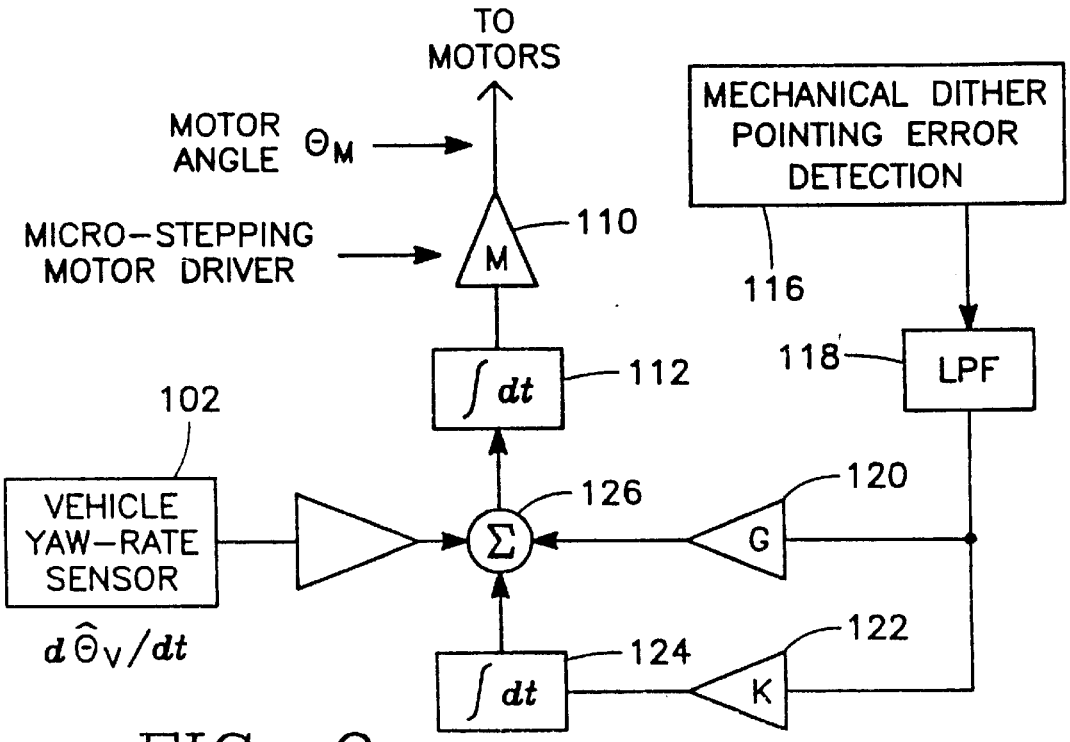
FIG. 9 is a block diagram of the feedback control system employed in the antenna controller of FIG. 8.

Referring to FIG. 9, the output of the vehicle yaw rate sensor 102 is integrated by an integrator 112 to compute the change in vehicle yaw angle. This change is output to the antenna stepping motor driver 110 so that the antenna rotates by the change in vehicle yaw angle to within a pointing angle error. However, as noted previously, the vehicle yaw rate sensor 102 is not particularly accurate and therefore does not provide fine control. Instead, fine control of the antenna azimuth angle is provided by a mechanical dithering algorithm 116 performed by the processor 106. This algorithm will be described below. The mechanical dithering algorithm 116 generates an error signal representing the pointing angle error which passes through a low pass filter 118 and is multiplied by a constant K in amplifier 120 as rate feedback and is multiplied by a constant G in amplifier 122 as acceleration feedback. The acceleration feedback from the amplifier 122 is integrated by an integrator 124 and the output of the integrator 124, the rate feedback from the amplifier 120 and the output of the vehicle yaw rate sensor 102 are summed at a node 126. The resulting sum is integrated by the integrator 112 to provide a fine adjustment command to the stepper motor 114.

Figures 10A, 10B, 10C:
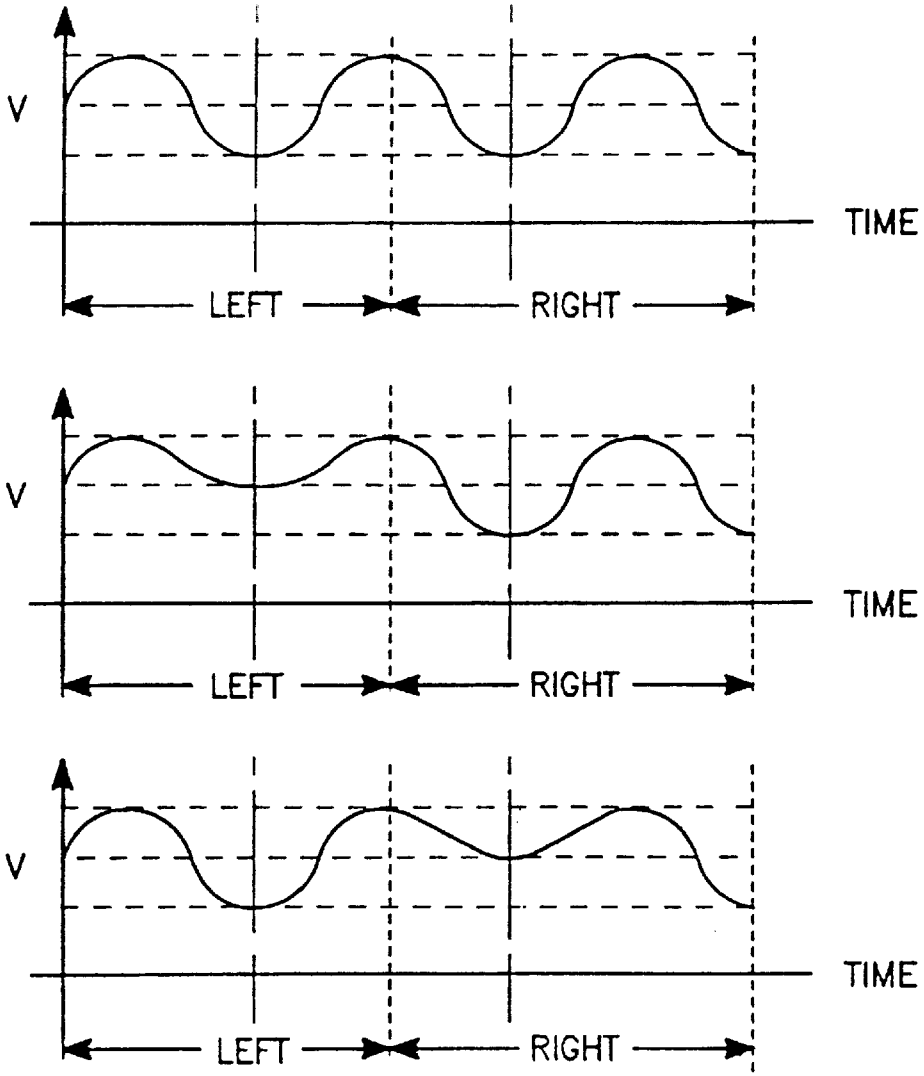
FIGS. 10A through 10C illustrate various waveforms of a received pilot signal during antenna dithering for three different antenna azimuth orientations.

The mechanical dithering algorithm 116 analyzes the received pilot signal from the satellite to compute fine azimuthal angle errors. In the process, the antenna azimuthal position is dithered about its commanded position symmetrically to the left and right thereof in a periodic motion which is sinusoidal over time through a small predetermined dither excursion angle slightly greater than the maximum pointing angle error of the integrated output of the vehicle yaw sensor 102. If the commanded azimuthal position of the antenna is error-free, variation in the received intensity of the pilot signal over time will correspond to the waveform of FIG. 10A, which is a perfectly symmetrical sine wave. If, however, the commanded azimuthal antenna position is slightly off to the left, then the intensity of the received pilot signal amplitude as a function of time will correspond with the waveform of FIG. 10B, in which the received signal amplitude at the left-most dither position is greater than that of the right-most dither position. This creates the asymmetrical sinusoidal waveform of FIG. 10B. Finally, if the commanded azimuthal antenna position has an error slightly off to the right, then the received pilot signal amplitude as a function time corresponds with the waveform of FIG. 10C, which is the opposite case from FIG. 10B. Specifically, in FIG. 10C the right-most dither position corresponds to a higher amplitude while the left-most dither position corresponds to a lower amplitude. In both FIGS. 10B and 10C, the locations of the peaks may be slightly shifted depending on the extent of the error.

Figure 11:
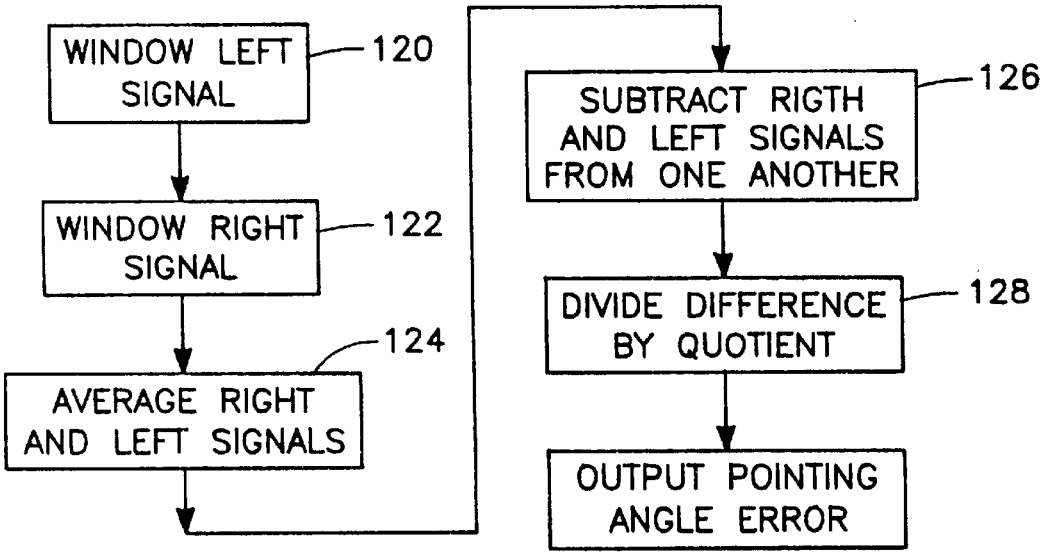
FIG. 11 is a block diagram illustrating the dithering algorithm employed in the feedback control of FIG. 9.

The CPU 106 processes the received pilot signal in accordance with the process illustrated in FIG. 11. The incoming pilot signal (corresponding to the waveform of FIG. 10A in the absence of any pointing error) is windowed with a sinusoidal mask corresponding to the sinusoidal dithering motion of the antenna. The signal is divided into right and left halves (labeled "RIGHT" and "LEFT" in FIG. 10A). The right-half signal is windowed (block 120 FIG. 11) while the left-half signal is separately windowed (block 122 FIG. 11) with a sine wave corresponding to the dither motion. The windowing steps may be considered as correlation of the received signals with a sine wave corresponding to the dithering motion of the antenna. The average of the two windowed signals is computed (block 124 FIG. 11). The results of steps of blocks 120, 122, namely the windowed right-half and left-half signals, are subtracted from one another algebraically (block 126) and the result is divided by the average computed in step of block 124 (block 128). The quotient computed in the step of block 128 corresponds to the pointing angle error term of the dithering process 116 of FIG. 9 which is output to the low pass filter 118 of FIG. 9. The purpose of the low pass filter 118 of FIG. 9 is to filter out the dithering noise corresponding to the sinusoidal motion of the antenna.

Preferably, the foregoing dithering algorithm utilizes the K-band pilot signal accompanying the main received K-band signal from the satellite.

Preferably, the antenna components including the reflector dish 66 and the feed horn 64 as well as the RF components including the upper and lower diplexers 60, 56, the rotary joint 58 and the orthomode transducer 62 are each formed of highly conductive metal such as copper or aluminum.

While the invention has been described in detail by specific reference to preferred embodiments thereof, it is understood that the variations modifications may be made without departing from the true spirit and scope of the invention.

What is claimed is:

1. A compact dual-band mobile satellite-tracking antenna system [for mounting] *mountable* on a movable body for communicating with a satellite in earth orbit *while said body is at rest or in motion*, said antenna system comprising:

a parabolic reflector dish having an elliptical aperture with major and minor elliptical axes, said major elliptical axis being aligned in a generally horizontal direction and said minor elliptical axis being aligned in a generally vertical direction;

a feed-horn having a back end and an open front end facing said reflector dish at a focal point thereof and comprising vertical side walls opening out from said back end to said front end at a first horn angle and horizontal top and bottom walls opening out from said back end to said front end at a second horn angle, said first horn angle being less than said second horn angle;

means for transmitting to said feed-horn signals of a first frequency band for transmission via said reflector dish to said satellite and receiving from said feed-horn signals of a second frequency band reflected by said reflector dish from said satellite; and antenna [attitude] control means for maintaining an antenna azimuth direction relative to said satellite, wherein said reflector dish has a fixed elevational angle *relative to said movable body* corresponding to an elevation of said satellite; and wherein said major elliptical axis is aligned in a generally horizontal direction and said first horn angle is chosen [whereby] to maximize azimuthal directionality of said reflector dish, and said minor elliptical axis is aligned in a generally vertical direction and said second horn angle is chosen [whereby] to minimize elevational directionality of said reflector dish to an extent corresponding to expected pitch *and roll* excursions of said movable body.

2. The antenna system of claim 1 wherein said [reflectors] *reflector* dish and feed-horn are mounted on a generally horizontal platform rotatable in azimuth, said antenna [attitude] control means comprising:

means for rotating said rotatable platform through an azimuth angle in response to sensed yaw motions of said movable body so as to compensate for said yaw motions to within a pointing error angle;

means for sinusoidally dithering said rotatable platform through a small azimuth dither angle greater than said pointing error angle while sensing a signal from said satellite received at said reflector dish*, thereby sinusoidally modulating in amplitude said signal from said satellite while said signal is being received; and* means for extracting amplitude variations in said signal sensed from said satellite corresponding to sinusoidal dithering of [the] *said* rotatable platform by [the] *said* means [of] *for* sinusoidally dithering *said rotatable platform* and for deducing therefrom [said] *a deduced* pointing error angle, and for transmitting a correction signal corresponding [thereof] *to said deduced pointing error angle* to said means for rotating *said rotatable platform*.

3. The antenna system of claim 1 wherein said first and second bands comprise [K] *Ka* and [Ka] *K* communication bands, respectively, and wherein said reflector dish extends on the order of ten wavelengths along said major elliptical axis and on the order of several wavelengths along said minor elliptical axis.

4. The antenna system of claim 3 wherein said feed-horn is on the order of 1.5 inches long, 0.75 inches high and 0.5 inches wide at said front end thereof.

5. The antenna system of claim 3 wherein said elliptical aperture is projected onto a paraboloid of said reflector dish along an ellipse projection axis lying at a projection angle with respect to a parabolic axis of said paraboloid of said reflector dish.

6. The antenna system of claim 5 wherein said projection angle is on the order of 25.2 degrees, said paraboloid has a parabolic focal length of 1.673 in. and said elliptical aperture extends on the order of 5.9 in. along said major axis and 2.3 in. along said minor axis.

7. The antenna system of claim 2 wherein said means for transmitting to said feed-horn signals of a first frequency band and receiving from said feed-horn signals of a second frequency band comprises a microwave rotary joint concentric with said rotatable platform for coupling signals of said first and second bands between said feed-horn and a microwave transmitter and a microwave receiver.

8. The antenna system of claim 7 wherein said means for transmitting to said feed-horn signals of a first frequency band and receiving from said feed-horn signals of a second frequency band further comprises:

an orthomode transducer coupled to said back end of said feed-horn and having first and second ports corresponding to said first and second frequency bands; *and* a diplexer having a common port for conducting signals of both said first and second bands, said common port *being* connected to said rotary joint, and separate ports [corresponding to] *for* said first and second bands [respectively], said separate ports of said diplexer being connected to corresponding ones of said first and second ports of said orthomode transducer.

9. The antenna system of claim 1 wherein said lesser horn angle is on the order of 2 degrees and said greater horn angle is on the order of 13 degrees.

10. The antenna system of claim 2 wherein said dither angle is on the order of 1 degree to the right and *1 degree* to the left of a current antenna azimuth angle commanded by said means for rotating and wherein said sinusoidal dithering has a rate on the order of 2 Hz.

11. The antenna system of claim 10 further comprising a yaw rate sensor for sensing a rate of change of said yaw angle with a bandwidth on the order of 300 Hz.

12. The antenna system of claim 1 further comprising a radome covering said reflector dish and said feed-horn and having a diameter on the order of 23 cm.

13. The antenna system of claim 1 wherein *a beam of* said reflector dish is aligned with an elevational angle [of on the order of 46 degrees] *corresponding to an elevation angle of any particular satellite selected for communications from a given geographical region* and said feed-horn points at said reflector dish at an angle [of] on the order of 4 degrees with respect to horizontal.

14. A compact dual-band mobile satellite-tracking antenna system [for mounting] *mountable* on a movable body for communicating with a satellite in earth orbit, said antenna system comprising:

a reflector dish having a non-symmetrical aperture with major and minor axes, said major axis being aligned in a generally horizontal direction and said minor axis being aligned in a generally vertical direction;

a feed-horn having a back end and an open front end facing said reflector dish at a focal point thereof and comprising vertical side walls opening out from said back end to said front end at a first horn angle and horizontal top and bottom walls opening out from said back end to said front end at a second horn angle, said first horn angle being less than said second horn angle;

means for transmitting to said feed-horn signals of a first frequency band for transmission via said reflector dish to said satellite and receiving from said feed-horn signals of a second frequency band reflected by said reflector dish from said satellite; and antenna [attitude] control means for maintaining an antenna azimuth direction relative to said satellite, wherein said reflector *dish* has a fixed elevational angle *relative to said movable body* corresponding to an elevation of said satellite; and wherein[,] said major axis is aligned in a generally horizontal direction and said first horn angle is chosen [whereby] to maximize azimuthal directionally of said reflector dish, and said minor axis is aligned in a generally vertical direction and said second horn angle is chosen [whereby] to minimize elevational directionally of said reflector dish to an extent corresponding to expected pitch *and roll* excursions of said movable body.

15. The antenna system of claim 14 wherein said reflector dish and said feed-horn are mounted on a generally horizontal platform rotatable in azimuth, said antenna control means comprising:

means for rotating said rotatable platform through an azimuth angle in response to sensed yaw motions of said movable body so as to compensate for said yaw motions to within a pointing error angle;

means *for* sinusoidally dithering said rotatable platform through a small azimuth dither angle greater than said pointing error angle while sensing a signal from said satellite received at said reflector dish*, thereby sinusoidally modulating in amplitude said signal from said satellite while said signal is being received; and* means for extracting amplitude variations in said signal sensed from said satellite corresponding to sinusoidal dithering of [the] *said* rotatable platform by *said* means for sinusoidally dithering *said rotatable platform* and for deducing therefrom [said] *a deduced* pointing error angle, and for transmitting a correction signal corresponding thereto to said means for rotating *said rotatable platform*.

16. The antenna system of claim 15 wherein said first and second *frequency* bands comprise [K] *Ka* and [Ka] *K* communication bands, respectively, and wherein said reflector dish extends on the order of ten wavelengths along said major axis and on the order of several wavelengths along said minor elliptical axis.

17. The antenna system of claim 16 wherein said feed-horn is on the order of 1.5 inches long *and said feed-horn at a front end thereof is 0.75 inches high and 0.5 inches wide*.

18. The antenna system of claim 15 wherein said means for transmitting to said feed-horn signals of a first frequency band and receiving from said feed-horn signals of a second frequency band comprises a microwave rotary joint concentric with said rotatable platform for coupling signals of said first and second bands between said feed-horn and a microwave transmitter and a microwave receiver.

19. The antenna system of claim 18 wherein said means for transmitting to said feed-horn signals of a first frequency band and receiving from said feed-horn signals of a second frequency band further comprises:

an orthomode transducer coupled to said back end of said feed-horn and having first and second ports [corresponding to] *for* said first and second frequency bands*, respectively; and* a diplexer having a common port for conducting signals of both said first and second bands, said common port *being* connected to said rotary joint, and separate ports [corresponding to] *for* said first and second *frequency* bands [respectively], said separate ports of said diplexer being connected to corresponding ones of said first and second ports of said orthomode transducer.

20. The antenna system of claim 15 wherein said dither angle is on the order of 1 degree to the right and *1 degree* to the left of a current antenna azimuth angle commanded by said means for rotating and wherein said sinusoidal dithering has a rate on the order of 2 Hz.

21. The antenna system of claim 20 further comprising a yaw rate sensor for sensing a rate of change of said yaw angle with a bandwidth on the order of 300 Hz.

22. The antenna system of claim 14 further comprising a radome covering said reflector dish and said feed-horn and having a diameter on the order of 23 cm.

23. The antenna system of claim 14 wherein *a beam of* said reflector dish is aligned with an elevational angle [of on the order of 46 degrees] *corresponding to an elevation angle of any particular satellite selected for communications from a given geographical region* and said feed-horn points at said reflector dish at an angle [of] on the order of 4 degrees with respect to horizontal.

24. A compact [dual-band] mobile satellite-tracking antenna system [for mounting] *mountable* on a movable body for [communicating with] *receiving communications from* a satellite in earth orbit *while said body is at rest or in motion*, said antenna system comprising:

a reflector dish having a non-symmetrical aperture with *orthogonal* major and minor axes *connected to said body*, said major axis being aligned *relative to said body* in a generally horizontal direction [whereby] to maximize azimuthal directionality of said reflector dish and said minor axis being aligned in a generally vertical direction [whereby] to minimize elevational directionality of said reflector dish to an extent corresponding to expected pitch excursions of said movable body;

a feed-horn having a back end and an open front end facing said reflector dish at a focal point thereof and comprising vertical side walls opening out from said back end to said front end at a first horn angle and horizontal top and bottom walls opening out from said back end to said front end at a second horn angle, wherein said first horn angle is less than said second horn angle, and wherein said reflector dish and said feed-horn are mounted on a generally horizontal platform rotatable in azimuth;

means for rotating said rotatable platform through an azimuth angle in response to sensed yaw motions of said movable body so as to compensate for said yaw motions to within a pointing error angle;

means for sinusoidally dithering said [rotatable platform] *reflector dish and said feed-horn as a unit* through a small azimuth dither angle greater than said pointing error angle while sensing a signal from said satellite received at said reflector dish*, thereby producing an amplitude-modulated signal from said signal being sensed*;

means for extracting *from* amplitude variations in said *amplitude-modulated* signal [sensed from said satellite] *an error signal* corresponding to sinusoidal dithering of [the] *said* rotatable platform by [the] means for sinusoidally dithering and [for] deducing therefrom [said] *a deduced* pointing error angle, and

*means* for transmitting a correction signal corresponding thereto to said means for rotating *said rotatable platform corresponding to said deduced pointing error angle*.

25. The antenna system of claim 24 *for transmitting communications to said satellite as well as receiving communications therefrom using first and second frequency*

*bands,* wherein said first and second *frequency* bands comprise [K] *Ka* and [Ka] *K* communication bands, respectively, and wherein said reflector dish *aperture* extends on the order of ten wavelengths along said major [elliptical] axis and on the order of several wavelengths along said minor [elliptical] axis.

26. The antenna system of claim 25 wherein said feed-horn is on the order of 1.5 inches long *and said feed-horn at a front end thereof is 0.75 inches high and 0.5 inches wide.*

27. The antenna system of claim 24 further comprising means for transmitting to said feed-horn signals of a first frequency band and receiving from said feed-horn signals of a second frequency band.

28. The antenna system of claim 27 wherein said means for transmitting and receiving comprises a microwave rotary joint concentric with said rotatable platform for coupling signals of said first and second bands between said feed-horn and a microwave transmitter and a microwave receiver.

29. The antenna system of claim 28 wherein said means for transmitting to said feed-horn signals of a first frequency band and receiving from said feed-horn signals of a second frequency band further comprises:

an orthomode transducer coupled to said back end of said feed-horn and having first and second ports [corresponding to] *for* said first and second frequency bands, *respectively; and* a diplexer having a common port for conducting signals of both said first and second bands, said common port *being* connected to said rotary joint, and separate ports [corresponding to] *for* said first and second *frequency* bands [respectively], said separate ports of said diplexer being connected to corresponding ones of said first and second ports of said orthomode transducer.

30. The antenna system of claim 24 wherein said dither angle is on the order of 1 degree to the right and *1 degree* to the left of a current antenna azimuth angle commanded by said means for rotating *said platform* and wherein said sinusoidal dithering has a rate on the order of 2 Hz.

31. The antenna system of claim 30 further comprising a yaw rate sensor for sensing a rate of change of said yaw angle with a bandwidth on the order of 300 Hz.

32. The antenna system of claim 24 further comprising a radome covering said reflector dish and said feed-horn and having a diameter on the order of 23 cm.

33. The antenna system of claim 24 wherein *a beam of* said reflector dish is aligned with an elevational angle [of on the the order of 46 degrees] *corresponding to an elevation angle of any particular satellite selected for communications from a given geographical region* and said feed-horn points at said reflector dish at an angle [of] on the order of 4 degrees with respect to horizontal.

34. The antenna system of claim 24 wherein said reflector dish is adjustable to any fixed elevational orientation *corresponding to an elevational angle of any particular satellite* within a predetermined range of elevational orientations corresponding to a geographical region of mobility of said [antenna system] *movable body.*

*35. A satellite-tracking antenna system comprising an antenna having a fixed rotation axis with respect to a mobile body, said fixed rotation axis being approximately vertical while said mobile body is at rest or moving on a horizontal surface and not vertical while moving on a nonhorizontal surface, wherein said antenna system is rotatable in azimuth about said fixed rotation axis for receiving at least a pilot signal from a satellite while said body is at rest or in motion, and wherein said antenna has an aperture with orthogonal major and minor axes, said major axis being aligned in a generally perpendicular orientation with respect to said rotation axis to maximize azimuthal directionality of said antenna and said minor axis being aligned in a plane at an angle with respect to said rotation axis generally equal to the elevation angle of said satellite, thereby providing less elevational directionality of said antenna to an extent corresponding to expected pitch and roll of said body while providing pronounced azimuthal directionality of said antenna; and further comprising:*

*antenna azimuth control means for rotating said antenna about said rotation axis while said body is in motion, said antenna azimuth control means operating automatically to maintain azimuthal pointing of said antenna toward said satellite to within a pointing error angle while said body is in motion and orientation of said antenna is maintained by optimally tracking in azimuth the signal strength of said pilot signal with said antenna maintaining said minor axis at a fixed angle relative to said rotation axis.*

*36. The antenna system of claim 35 including means for receiving said pilot signal from said satellite through said aperture of said antenna whereby said antenna azimuth control means includes:*

*means for sensing yaw motions of said body;*

*means for rotating said antenna through an azimuth angle in response to sensed yaw motions of said body so as to compensate for said yaw motions to within said pointing error angle;*

*means for sinusoidally dithering said antenna about said rotation axis through a small azimuth dither angle greater than said pointing error angle while sensing a signal received from said satellite by said receiving means through said aperture of said antenna, thereby sinusoidally amplitude modulating said signal received from said satellite, and*

*means for extracting amplitude variations in said signal sensed from said satellite corresponding to sinusoidal dithering of said antenna and for deducing therefrom said pointing error angle, and further means for transmitting a correction signal corresponding to said pointing error angle to said means for rotating said antenna about said rotation axis to null and pointing error angle.*

*37. The antenna system of claim 36 wherein said means for receiving said pilot signal from said satellite is adapted to receive said pilot signal and other signals in a particular frequency band, and wherein said antenna aperture extends on the order of ten wavelengths of said particular frequency band along said major axis and on the order of several wavelengths of said particular frequency band along said minor axis.*

*38. The antenna system of claim 37 including means for transmitting signals to said satellite in a frequency band distinct from said particular frequency band of received signals.*

*39. The antenna system of claim 38 wherein said distinct frequency band and said particular frequency band are Ka and K communication bands, respectively.*

* * * * *